US008902814B2

(12) United States Patent
Kim et al.

(10) Patent No.: US 8,902,814 B2
(45) Date of Patent: Dec. 2, 2014

(54) APPARATUS AND METHOD FOR CONTROLLING MULTIMEDIA BROADCAST AND MULTICAST SERVICE BASED ON USER LOCATION

(75) Inventors: Dae Ik Kim, Daejeon (KR); Chul Park, Daejeon (KR); Jee Hyeon Na, Daejeon (KR); Sang Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 467 days.

(21) Appl. No.: 12/974,608

(22) Filed: Dec. 21, 2010

(65) Prior Publication Data

US 2011/0149830 A1    Jun. 23, 2011

(30) Foreign Application Priority Data

Dec. 21, 2009    (KR) .................. 10-2009-0127947

(51) Int. Cl.
*H04W 4/00*        (2009.01)
*H04L 12/18*       (2006.01)
*H04W 4/06*        (2009.01)
*H04W 4/02*        (2009.01)

(52) U.S. Cl.
CPC . *H04W 4/06* (2013.01); *H04W 4/02* (2013.01); *H04L 12/1845* (2013.01); *H04L 12/189* (2013.01)
USPC ....................................................... 370/328

(58) Field of Classification Search
CPC ... H04L 12/1845; H04L 12/189; H04W 4/02; H04W 4/06; H04W 52/00–52/0296
USPC ......... 370/328, 329, 335, 337, 485, 486, 487, 370/488; 455/445, 446, 466, 414.1, 414.2, 455/509, 571, 573, 574
See application file for complete search history.

(56) References Cited

U.S. PATENT DOCUMENTS

| 2005/0007971 | A1* | 1/2005 | Jeong et al. .................... 370/312 |
| 2005/0090259 | A1  | 4/2005 | Jain et al. |
| 2005/0096017 | A1* | 5/2005 | Kim ............................ 455/414.1 |
| 2005/0213583 | A1* | 9/2005 | Lee et al. .................... 370/395.5 |
| 2007/0206530 | A1* | 9/2007 | Lee et al. ....................... 370/329 |
| 2008/0123591 | A1* | 5/2008 | Jung et al. ..................... 370/330 |
| 2008/0267109 | A1  | 10/2008 | Wang et al. |

(Continued)

FOREIGN PATENT DOCUMENTS

| JP | 2006-528456 | 12/2006 |
| JP | 2007-518340 | 7/2007 |

(Continued)

*Primary Examiner* — Ricky Ngo
*Assistant Examiner* — Kabir Jahangir
(74) *Attorney, Agent, or Firm* — Nelson Mullins Riley & Scarborough LLP; Anthony A. Laurentano, Esq.; Dipti Ramnarain, Esq.

(57) ABSTRACT

Provided is a multimedia broadcast and multicast service controlling apparatus and method based on a user location. The multimedia broadcast and multicast service controlling apparatus may receive MCCH information, may periodically update a service list of a mobile terminal based on the received MCCH information, the service list listing services that are providable, may register a service in a pending list when the service is not included in the updated service list and is requested to be provided, and may provide the service registered in the pending list when the mobile terminal reaches a location where the mobile terminal may provide the service registered in the pending list.

20 Claims, 6 Drawing Sheets

(56) References Cited

U.S. PATENT DOCUMENTS

| | | | | |
|---|---|---|---|---|
| 2008/0311892 A1* | 12/2008 | Lee et al. | ................... | 455/414.1 |
| 2008/0311949 A1* | 12/2008 | Koskinen et al. | ............. | 455/525 |
| 2008/0316964 A1* | 12/2008 | Fischer | ........................ | 370/329 |
| 2010/0233990 A1* | 9/2010 | Kitahara et al. | ............ | 455/404.1 |
| 2011/0077006 A1* | 3/2011 | Hsu | .............................. | 455/436 |
| 2011/0218004 A1* | 9/2011 | Catovic et al. | ................ | 455/509 |

FOREIGN PATENT DOCUMENTS

| | | |
|---|---|---|
| KR | 1020050101006 | 10/2005 |
| KR | 10-0624243 | 9/2006 |
| KR | 1020070006850 | 1/2007 |
| KR | 1020090038716 | 4/2009 |

\* cited by examiner

APPARATUS AND METHOD FOR CONTROLLING MULTIMEDIA BROADCAST AND MULTICAST SERVICE BASED ON USER LOCATION

CROSS-REFERENCE TO RELATED APPLICATION

This application claims the benefit of Korean Patent Application No. 10-2009-0127947, filed on Dec. 21, 2009, in the Korean Intellectual Property Office, the disclosure of which is incorporated herein by reference.

BACKGROUND

1. Field of the Invention

The present invention relates to a multimedia broadcast and multicast service controlling apparatus and method based on a user location, and more particularly, to a multimedia broadcast and multicast service controlling apparatus and method that may provide a service when a mobile terminal reaches a location where the user can receive the service, when the service is not providable at a current location and is requested.

2. Description of the Related Art

A Long Term Evolution (LTE)-Advanced system defines a Multimedia Broadcast Multicast service Single Frequency Network (MBSFN) based Multimedia Broadcast and Multicast Service (MBMS) to provide a broadcast service via a communication network. The MBSFN is a method that enables all base stations included in an MBSFN area to synchronize radio resources to simultaneously transmit the same data at the same time. Accordingly, when a mobile terminal is located in a boundary of a cell, a signal of a neighbor base station may act as a gain as opposed to acting as interference. Therefore, in the MBSFN area, the mobile terminal may recognize MBMS data transmitted from the all base stations as MBMS data transmitted from a single base station. Also, the mobile terminal may receive a seamless broadcast service in the MBSFN area without separately performing a handover.

When the MBSFN-based MBMS service is provided, each of all services provided in a network may be one-to-one mapped to one multicast traffic channel (MTCH) among logical channels, and a plurality of MTCHs may be N-to-one mapped to one Multicast Channel (MCH) among transport channels. A single MCH may be one-to-one mapped to one Physical Multicast Channel (PMCH) among physical channels. In this case, depending on a feature of a service, a plurality of PMCHs may exist, and the PMCHs may have different Modulation and Coding Schemes (MCSs) from each other. For example, a broadcast service having a low definition and a broadcast service having a high definition may be mapped to different PMCHs, and a low MCS level, for example, a QPSK modulation scheme, may be applied to the PMCH to which the broadcast service having the low definition is mapped, and a high MCS level, for example, a 64 QAM modulation scheme, may be applied to the PMCH to which the broadcast service having the high definition is mapped. In this manner, a network may multiplex channels and may effectively use the radio resource based on the feature of the service. However, an area where the base station transmits data may be changed based on an MCS level. A mobile terminal close to the base station may receive both data transmitted at a high MCS level and data transmitted at a low MCS level, whereas a mobile terminal far away from the base station may only receive the data transmitted at the low MCS level. When the user requests to be provided with a service having a high MCS level while being far away from the base station, the mobile terminal may perform a procedure for reception even though the mobile terminal is not capable of receiving the service, and thus, a waste of battery power of the mobile terminal may occur.

Therefore, there is a need for a method of minimizing a consumption of battery power of a mobile terminal caused when an MBMS is provided, regardless of a location of the mobile terminal, in an MBSFN environment where MBMS data having different MCS levels are transmitted.

SUMMARY

According to an aspect of the present invention, there is provided a multimedia broadcast and multicast service controlling apparatus based on a user location, and the apparatus includes a receiving unit to receive multicast control channel (MCCH) information, a list updating unit to periodically update a service list of a mobile terminal using the received MCCH information, the service list listing services that are providable, a pending list registration unit to register a service in a pending list when the service is not included in the updated service list and is requested to be provided, and a service providing unit to provide the service registered in the pending list when the mobile terminal reaches a location where the mobile terminal is capable of providing the service registered in the pending list.

The list updating unit may include an information extracting unit to extract, from the received MCCH information, physical multicast channel (PMCH) setting information and service information provided via each PMCH, and the list updating unit may update the service list listing services providable at a current location, based on the PMCH setting information and the service information provided via each PMCH.

The list updating unit may further include a PMCH measuring unit to periodically detect whether each PMCH is capable of being used for reception, and the list updating unit may set a service provided via a PMCH capable of being used for reception as a service that is providable, and may set a service provided by a PMCH incapable of being used for reception as a service that is not providable, to update the service list.

The PMCH measuring unit may include a reference signal receiving unit to receive a reference signal with respect to each PMCH, and a PMCH determining unit to determine a PMCH of which a reference signal is received as the PMCH that is capable of being used for reception.

The pending list registration unit may include a reception determining unit to determine whether a PMCH mapped to a service is capable of being used for reception when the service that is not included in the generated service list is requested to be provided, and the pending list registration unit registers the requested service in the pending list when the determining determines that the PMCH mapped to the requested service is incapable of being used for reception.

The service providing unit may include a service providing determining unit to determine whether the mobile terminal is capable of providing at least one of services registered in the pending list at a current location, and the service providing unit may provide a service that is providable by the mobile terminal at the current location, among the services in the pending list.

According to an aspect of the present invention, there is provided a multimedia broadcast and multicast service controlling method based on a user location, and the method may include receiving MCCH information, periodically updating a service list of a mobile terminal using the received MCCH information, the service list listing services that are providable, registering a service in a pending list when the service is not included in the updated service list and is requested to be provided, and providing the service registered in the pending list when the mobile terminal reaches a location where the mobile terminal is capable of providing the service registered in the pending list.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
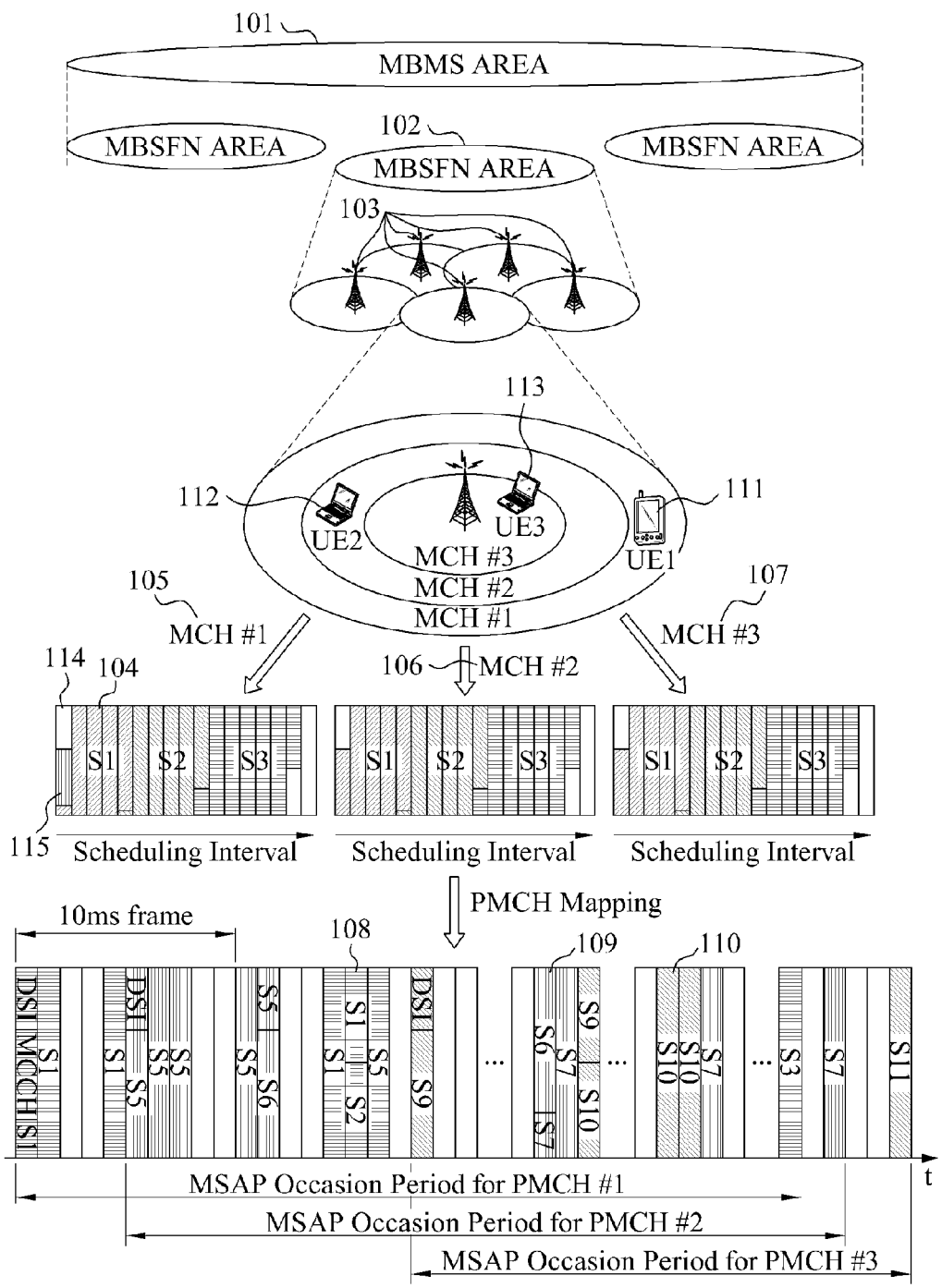
FIG. 1 is a diagram illustrating a method of providing a Multimedia Broadcast Multicast service Single Frequency Network (MBSFN) based-Multimedia Broadcast and Multicast Service (MBMS) in a Long Term Evolution (LTE)-Advanced system according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

FIG. 1 illustrates a method of providing a Multimedia Broadcast Multicast service Single Frequency Network (MBSFN) based-Multimedia Broadcast and Multicast Service (MBMS) in a Long Term Evolution (LTE)-Advanced system according to an embodiment of the present invention.

Referring to FIG. 1, the LTE-Advanced system may include an MBMS area 101 and the MBMS area 101 may include a plurality of MBSFN areas. In a single MBSFN area 102, all base stations 103 may synchronize radio resources to simultaneously transmit the same data at the same time. Accordingly, when a mobile terminal is located in a boundary of a cell, a signal of a neighbor base station may act as a gain as opposed to acting as interference. Therefore, in the MBSFN area 102, the mobile terminal may recognize MBMS data transmitted from all the base stations 103 as MBMS data transmitted from a single base station. Also, even when the mobile terminal is moving, the mobile terminal may receive a seamless broadcast service in the MBSFN area without separately performing a handover.

When the MBSFN-based MBMS service is provided, each of all services provided in a network may be one-to-one mapped to one multicast traffic channel (MTCH) 104 among logical channels, and a plurality of MTCHs may be N-to-one mapped to one of Multicast Channels (MCHs) 105, 106, and 107. One of MCHs 105, 106, and 107 may be one-to-one mapped to one of PMCHs 108, 109, and 110. Specifically, depending on a feature of a service, a plurality of PMCHs 108, 109, and 110 may exist, and the plurality of PMCHs 108, 109, and 110 may have different Modulation and Coding Schemes (MCSs) from each other.

For example, a service 1, a service 2, and a service 3 which have a low definition may be mapped to a PMCH #1 108 having a QPSK MSC level and may be transmitted based on a corresponding MCH Subframe Allocation Patten (MSAP). A service 5, a service 6, and a service 7 which have a mid-definition may be mapped to a PMCH #2 109 having a 16 QAM MCS level and may be transmitted based on a corresponding MSAP. A service 9, a service 10, and a service 11 which have a high definition may be mapped to a PMCH #3 110 having a 64 QAM MCS level and may be transmitted based on a corresponding MSAP. Therefore, the network may multiplex channels and may effectively use the radio resource based on the feature of the service. However, an area where the base station transmits data may be changed based on an MCS level.

Therefore, a mobile terminal 1 (UE1) 111 located at an edge of a cell may receive the service 1, the service 2, and the service 3 transmitted at a low MCS level, and a mobile terminal 2 (UE2) 112 located between the center and edge of the cell may receive the service 5, the service 6, and the service 7 having the mid-definition, in addition to the service 1, the service 2 and the service 3. A mobile terminal 3 (UE3) 113 located towards the center of the cell may receive all services.

In this case, a user utilizing the UE1 111 requests to be provided with the service 9 having the high MCH level, the UE1 111 may perform decoding of Dynamic Scheduling Information (DSI) 114 of the MCH #3 107 for each MSAP occasion period to receive the service 9 even though the UE1 111 is in a location where the UE1 111 is not capable of receiving the service 9, and thus, a waste of battery power of a mobile terminal may occur.

Therefore, according to an embodiment of the present invention, a service list listing services that are providable may be provided to a user based on a location of the mobile terminal, and, when the user requests to provide a service that is not providable, the service may be provided when the mobile terminal reaches a location where the service is providable, to minimize consumption of battery power.

The DSI 114 may indicate subframe information associated with services transmitted to a corresponding PMCH, and may be dynamically and differently allocated for each MSAP occasion period. The mobile terminal may decode the DSI 114 to recognize a subframe through which the corresponding service is transmitted, and may receive the service from the corresponding subframe.

A Multicast Control Channel (MCCH) 115 is a channel used for transmitting multicast control information. The MBSFN area includes a single MCCH, and thus, the MCCH 115 may exist in a PMCH having a predetermined MCS level, and the MCCH 115 may, based on a modification period and a repetition period, be used periodically for transmission of the multicast control information. The MCCH 115 may include information associated with services currently transmitted in the MBSFN area and information associated with PMCHs to which the services are mapped, and the MCCH 115 may be changed every time that the services start or are completed.

Figure 2:
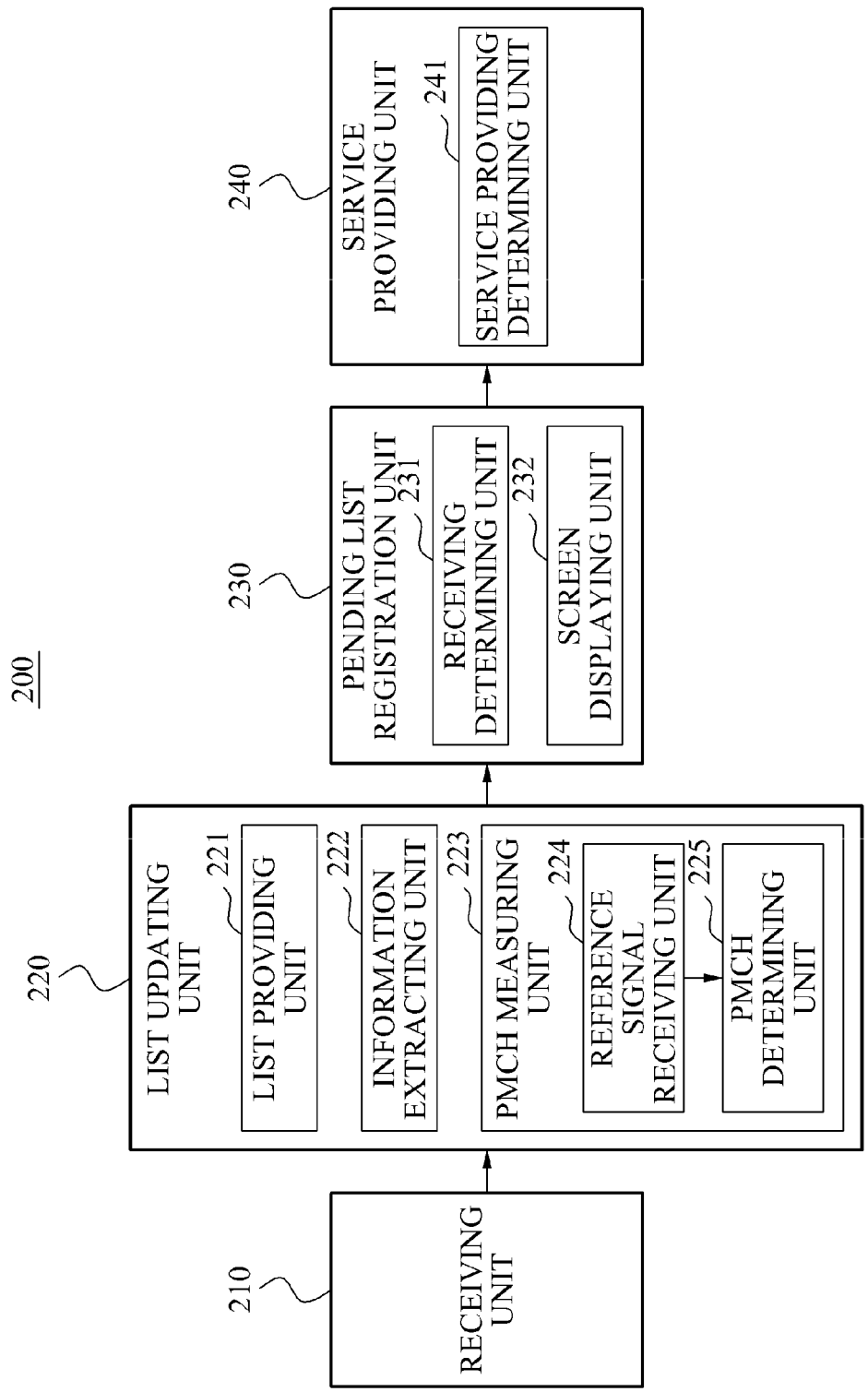
FIG. 2 is a block diagram illustrating a multimedia broadcast and multicast service controlling apparatus according to an embodiment of the present invention.

FIG. 2 illustrates a multimedia broadcast and multicast service controlling apparatus 200 according to an embodiment of the present invention.

Referring to FIG. 2, the multimedia broadcast and multicast service controlling apparatus 200 may include a receiving unit 210, a list updating unit 220, a pending list registration unit 230, and a service providing unit 240.

The receiving unit 210 may receive MCCH information. Here, the MCCH information may include information associated with services currently transmitted in an MBSFN area and information associated with PMCHs to which the services are mapped.

The list updating unit 220 may periodically update a service list of a mobile terminal based on the received MCCH information, the service list listing services that are providable. Specifically, the service list listing providable services may be updated based on a predetermined time period based on a location of the mobile terminal, and thus, the service list may be continuously updated to list the services providable at a current location. In this case, the updating unit 220 may include a list providing unit 221, an information extracting unit 222, and a PMCH measuring unit 223.

The information extracting unit 222 may extract, from the received MCCH information, PMCH setting information and service information provided via each PMCH. Therefore, the list updating unit 220 may update the service list listing providable services at the current location based on the PMCH setting information and the service information provided via each PMCH.

The PMCH measuring unit 223 may periodically detect whether each PMCH may be used for reception. In this case, the list updating unit 220 may set a service provided via a PMCH that may be used for reception as a providable service and may set a service provided via a PMCH that may not be used for reception as a service that is not providable, to update the service list. The PMCH measuring unit 223 may include a reference signal receiving unit 224 to receive a reference signal with respect to each PMCH, and may include a PMCH determining unit 225 to determine a PMCH through which the reference signal is received as the PMCH that may be used for the reception.

The list providing unit 221 may provide an updated service list every time that the updating is performed, and thus, may enable the user to check an accurate service list listing providable services at the current location.

When a service that is not included in the updated service list is requested, the pending list registration unit 230 may register the requested service in a pending list. Specifically, the service that is not included in the service list may not be providable at the current location and thus, the pending list registration unit 230 may register the service in a pending list as opposed to performing unnecessary operations for providing the service. Therefore, the service may be provided when the mobile terminal reaches a location where the service is providable.

The pending list registration unit 230 may include a reception determining unit 231 and a screen displaying unit 232. When a service that is not included in the updated service list is requested, the reception determining unit 231 may determine again whether a PMCH mapped to the requested service is the PMCH that may be used for the reception even though the requested service is included in the pending list. When the determining determines that the PMCH mapped to the requested service is the PMCH that may not be used for the reception, the pending list registration unit 230 may register the requested service in the pending list.

When the determining determines that the PMCH mapped to the requested service is the PMCH that may be used for the reception, the requested service may be immediately provided even though the requested service is not included in the updated service list. When the location of the mobile terminal is changed after the service list is updated, a PMCH may be determined to be used for receiving the service that is not included in the service list.

When the requested service is not providable at the current location, the screen displaying unit 232 may display a message that the requested service is not providable at the current location and thus, may help the user to not be frustrated due to the requested service not being immediately provided.

The service providing unit 240 may provide a service registered in the pending list, when the mobile terminal reaches a location where the service is providable. Here, the service providing unit 240 may include a service providing determining unit 241 to determine whether the mobile terminal may provide at least one service registered in the pending list, and may automatically provide the corresponding service when the mobile terminal reaches a location where the service is providable.

According to an embodiment, a service list listing services that is providable based on a location of a mobile terminal is provided, and, when a user requests to be provided with a service that is not providable, the requested service is provided when the mobile terminal reaches a location where the requested service is providable, and thus, consumption of the mobile terminal's battery power may be minimized.

Figure 3:
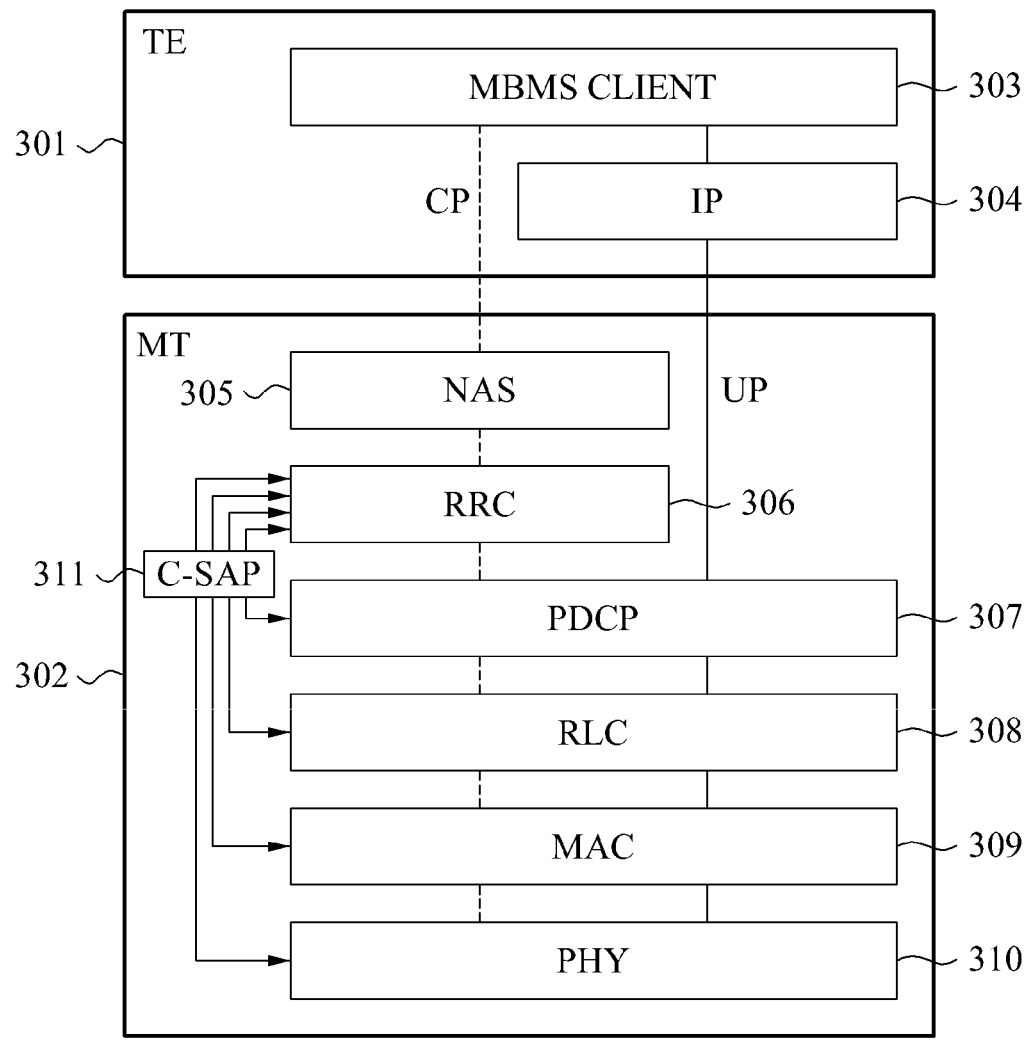
FIG. 3 is a block diagram illustrating an internal configuration of a mobile terminal for receiving an MBMS in an LTE-Advanced system according to an embodiment of the present invention.

FIG. 3 illustrates an internal configuration of a mobile terminal for receiving an MBMS in an LTE-Advanced system according to an embodiment of the present invention.

Referring to FIG. 3, a mobile terminal may include a terminal equipment (TE) 301 and a mobile terminal (MT) 302.

The TE 301 may include an MBMS client 303 and an IP layer 304, and MBMS data received, via MT 302, from the IP layer 304 may be outputted from the MBMS client 303 to the user.

The MT 302 may include a Non-Access Stratum (NAS) 305, a Radio Resource Control (RRC) 306, a Packet Data Convergence Protocol (PDCP) 307, a Radio Link Control (RLC) 308, a Medium Access Control (MAC) 309, and Physical Layer (PHY) 310.

The NAS 305 may perform an evolved packet system (EPS) bearer control, authorization, security control, and the like, the RRC 306 may perform system information control, paging, an RRC connection management, a wireless bearer control, a mobility control, and the like, and the PDCP 307 may perform header compression/decompression, user data transmission, encryption, and the like. The RLC 308 may perform an upper layer packet data unit (PDU) transmission, an error correction using an automatic repeat request (ARQ), connection/division/reconstruction of an RLC service data unit (SDU), redundancy detection, retransmission, and the like, the MAC 309 performs a logical channel and transmission channel mapping, multiplexing/demultiplexing of an MAC SDU, error correction using a hybrid automatic repeat request (HARM), dynamic scheduling, and the like, and the PHY 310 may perform link adaptation, power control, a cell search, and the like.

Based on the described structures, operations among control planes, namely, operations among PHY 310-MAC 309-RLC 308-PDCP 307-RRC 306-NAS 305-MBMS Client 303, may be performed, and operations among user planes, namely, operations among PHY 310-MAC 309-RLC 308-PDCP 307-IP-MBMS Client 303, may be performed based on the described structures. The RRC 306 may control the PDCP 307, the RLC 308, the MAC 309, and the PHY 310 through a Control-Service Access Point (C-SAP) 311, to perform radio resource control.

Figure 4:
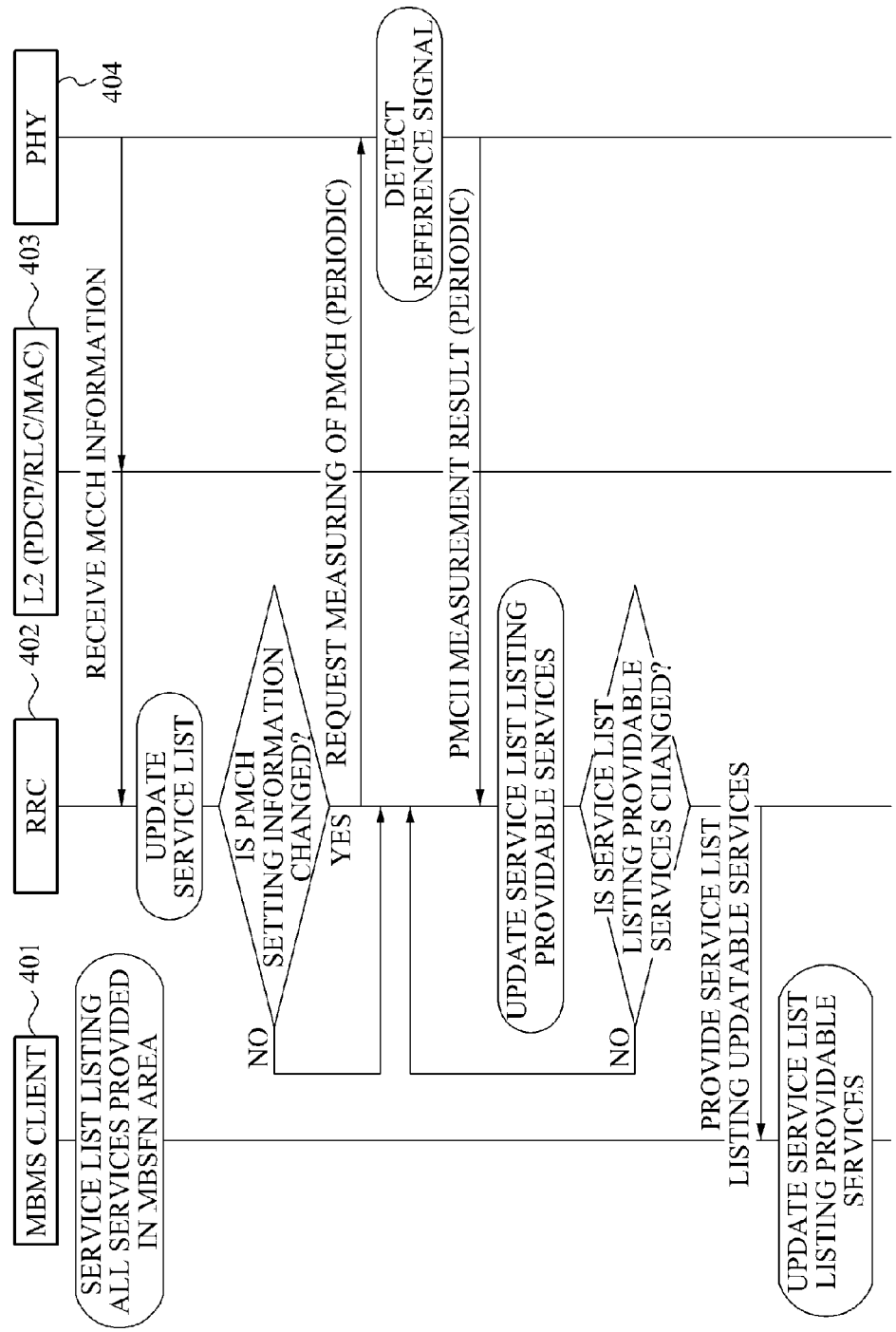
FIG. 4 is a diagram illustrating a method of detecting a service that is providable, based on a location of a user, according to an embodiment of the present invention.

FIG. 4 illustrates a method of detecting a service that is providable, based on a user location, according to an embodiment of the present invention.

Referring to FIG. 4, an MBMS client 401 includes a service list listing all services provided in an MBSFN area where a mobile terminal is located, and a user may request the mobile terminal to provide a service based on information included in the service list. The service list information may be received via a short message service (SMS) cell broadcast, an MBMS broadcast mode, a hypertext transfer protocol (HTTP), a file transfer protocol (FTP), a multi-media messaging service (MMS), a wide area paging (WAP), and the like, and the service list information may include information, such as a service identification, a service time, a service type, and the like.

The RRC 402 may receive the service list information associated with a service that is currently provided and MCCH information including information associated with PMCHs where the corresponding service is mapped to the corresponding service. In this case, the MCCH information may be changed when the service starts or is completed.

The RRC 402 may determine whether PMCH setting information of PMCHs is changed. When the PMCH setting information of the PMCHs is changed, the RRC 402 may periodically request the PHY 404 to measure the PMCHs, based on the changed PMCH setting information. When the PMCH setting information of the PMCHs is not changed, the RRC 402 may not change a periodic request for measuring the PMCHs and may maintain the periodic request.

The PHY 404 may detect a reference signal to determine whether PMCHs may be used for reception during a PMCH measurement period set by the RRC 402. When the reference signal is detected, the PHY 404 may determine that the mobile terminal is in a location where the corresponding PMCH may be used for the reception. When the reference signal is not detected, the PHY 404 may determine the mobile terminal is located in where the corresponding PMCH may not be used for the reception. According to an embodiment of the present invention, whether the corresponding PMCH may be used for reception may be determined only by detecting the reference signal, and thus, consumption of the mobile terminal's battery power may be minimized.

The PHY 404 may report a measurement result to the RRC 402 every time that the PMCHs are measured, and may update a service list listing services that are providable at a current location based on the measurement result. In this case, the service list listing services that are providable at the current location may be configured based on service mapping information of each PMCH obtained from the MCCH information.

The RRC 402 may check whether the service list listing the services that are providable at the current location is changed. When the service list listing services that are providable at the current location is changed, the RRC 402 may transmit updated service list information to the MBMS client 401, and when the service list listing services that are providable at the current location is not changed, the RRC 402 may wait for a measurement result of subsequent PMCHs.

The MBMS client 401 may provide, based on the updated service list information, the service list listing services that are providable at the current location among services provided in the MBSFN area to the user.

According to an embodiment of the present invention, a service list listing services that are immediately providable may be provided, and thus, unnecessary consumption of a mobile terminal's battery power caused when a user requests a service that is not providable at the current location may be prevented.

Figure 5:
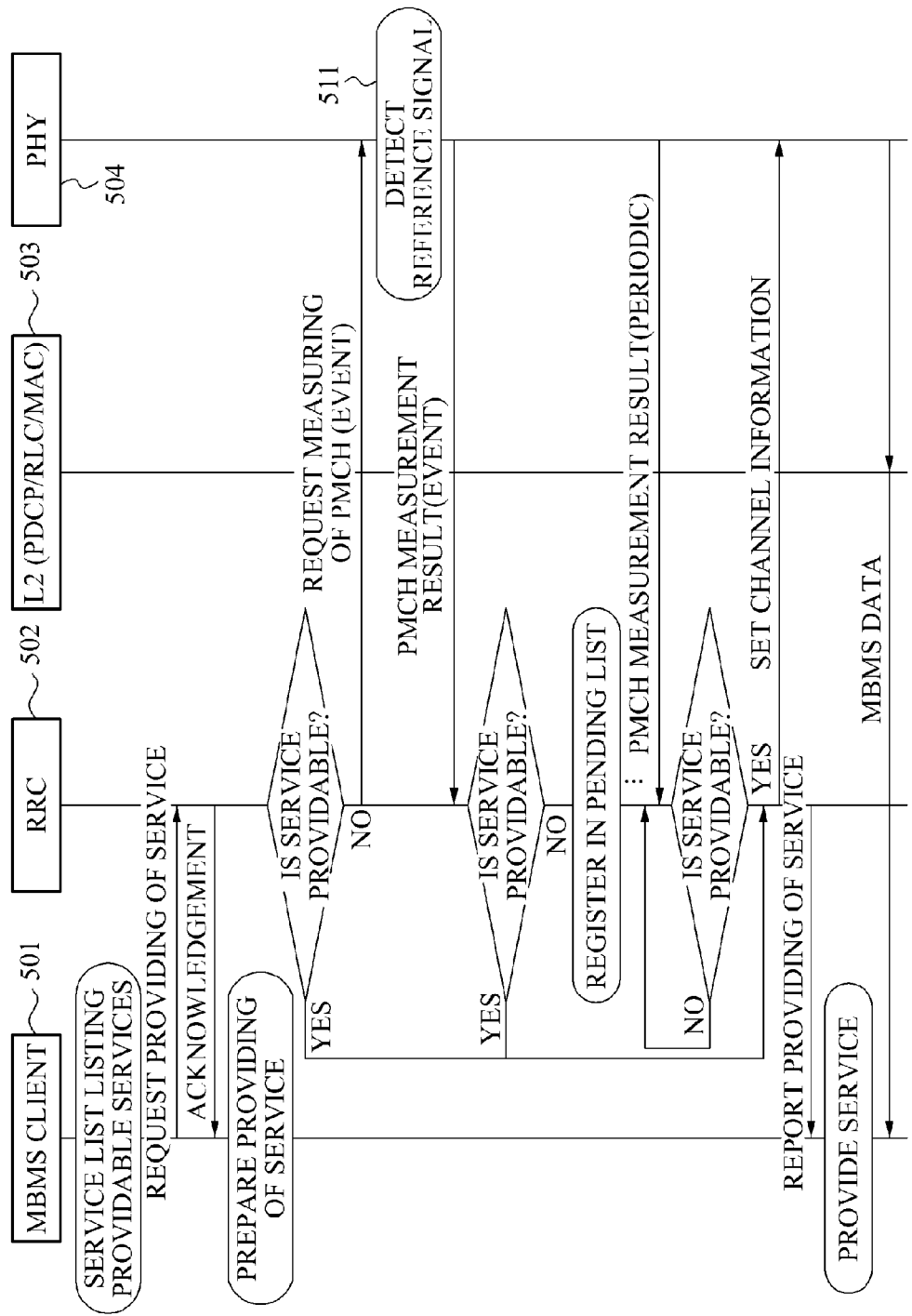
FIG. 5 is a diagram illustrating a method of activating an MBMS based on a user location, according to an embodiment of the present invention.

FIG. 5 illustrates a method of activating an MBMS based on a location of a user, according to an embodiment of the present invention.

Referring to FIG. 5, an MBMS client 501 may include a service list listing services that are immediately receivable in addition to a service list listing all services provided in the MBSFN where a mobile terminal is located. Accordingly, the user may request the mobile terminal to provide a service that is receivable at a current location, and may register a service to be provided when the mobile terminal reaches a location where the service is receivable. When the MBMS client 501 requests, in response to the request of the user, the RRC 502 to provide MBMS, the RRC 502 may transmit an acknowledgement message to the MBMS client 501, and the MBMS client 501 may receive the message to prepare for providing the MBMS.

The RRC 502 which is requested to provide the MBMS may determine whether the requested the MBMS is a providable at the current location. When the determining determines that the requested the MBMS is providable at the current location based on a periodic measurement result of the PHY 504, the RRC 502 may set channel information of the corresponding service to the L2(PDCP/RLC/MAC) 503 and the PHY 504, and may report, to the MBMS client 501, that the requested MBMS is provided. By then, the MBMS client 501 may provide the requested service and may receive MBMS data.

When the determining determines that the requested the MBMS is not providable based on the periodic measurement result of the PHY 504, the RRC 502 may immediately request the PHY 504 to measure a PMCH mapped to the requested the MBMS, since a location of the mobile terminal may be changed during a measurement period where the PMCH mapped to the requested service is measured.

When the PHY 504 is requested, by the RRC 502, to immediately measure the corresponding PMCH, the PHY 504 may detect a reference signal from a subframe through which the corresponding PMCH is transmitted, and may transmit a result to the RRC 502. When the RRC 502 receives the immediate detection result with respect to the PMCH, the RRC 502 may determine whether the the MBMS is providable. When the MBMS is providable, the RRC 502 may set channel information of the MBMS to the L2(PDCP/RLC/MAC) 503 and the PHY 504, and may report, to the MBMS client 501, that the corresponding MBMS is provided. By then, the MBMS client 501 may provide the service and may receive MBMS data.

When the RRC 502 determines that the the MBMS is not providable based on the immediate detection result with respect to the PMCH, the RRC 502 may store the requested MBMS in a pending service list, and may determine whether the requested MBMS is providable every time that a detection result with respect to the PMCHs is periodically received. When the mobile terminal is in a location where the corresponding MBMS is providable, the RRC 502 may set channel information to the L2(PDCP/RLC/MAC) 503 and the PHY 504, and may report, to the MBMS client 501, that the corresponding MBMS is provided. By then, the MBMS client 501 may provide the service and may receive MBMS data.

Figure 6:
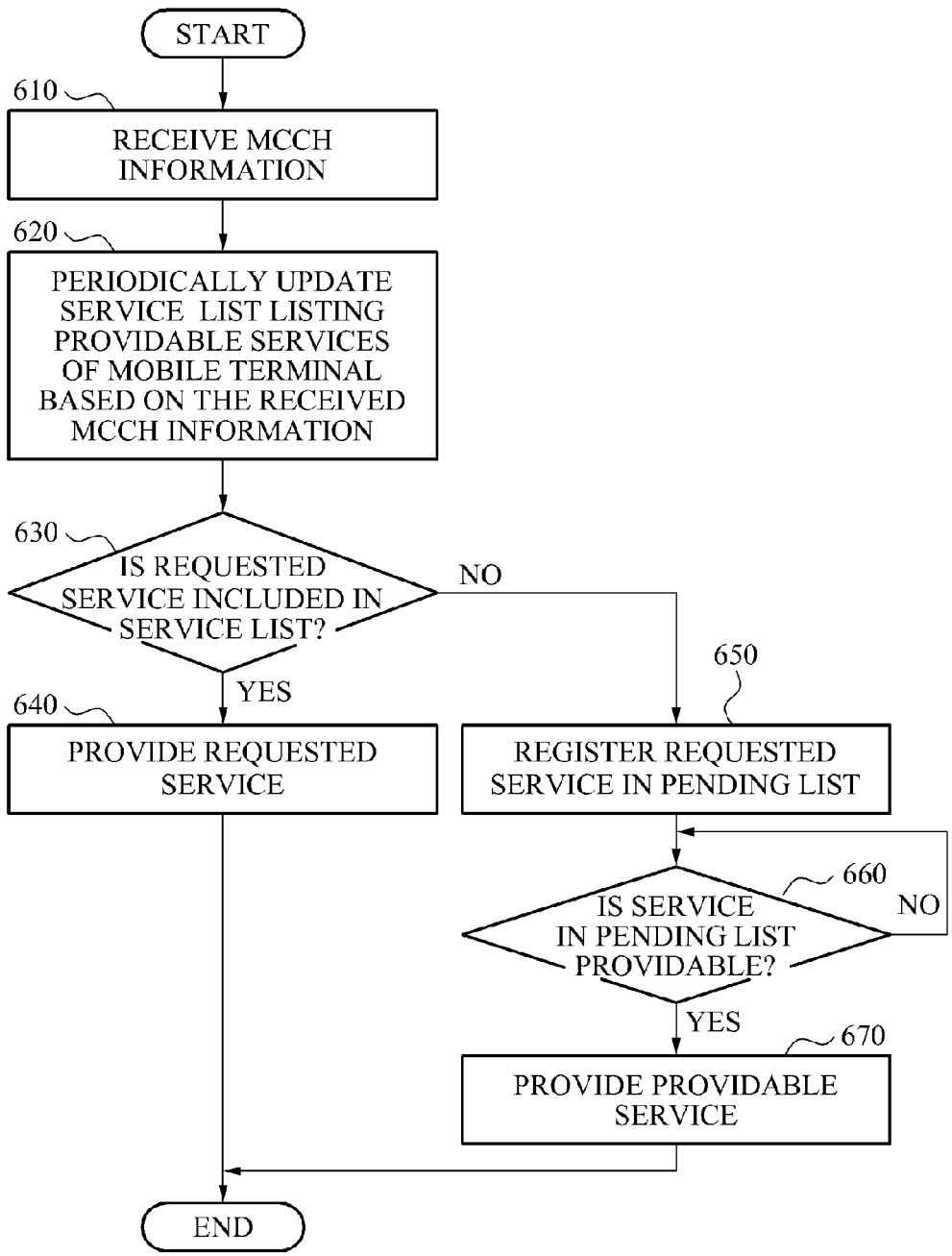
FIG. 6 is a flowchart illustrating a multimedia broadcast and multicast service controlling method according to an embodiment of the present invention.

FIG. 6 illustrates a multimedia broadcast/multicast service controlling method according to an embodiment of the present invention.

Referring to FIG. 6, MCCH information is received in operation 610.

In operation 620, a service list of a mobile terminal is periodically updated based on the received MCCH information, the service list listing services that are providable. In this case, operation 620 may include an operation of extracting, from the received MCCH information, PMCH setting information and service information provided via each PMCH, and an operation of updating, based on the PMCH setting information and the service information provided via each PMCH, the service list listing services that are providable at a current location, and thus the service list may be periodically updated. Specifically, whether each PMCH may be used for reception is periodically detected. A service provided via a PMCH that may be used for reception may be set as a service that is providable, and a service provided via a PMCH that may not be used for reception may be set as a service that is not providable. In this case, a reference signal is received with respect to each PMCH, and a PMCH which a reference signal is received may be determined as the PMCH that may be used for reception.

Also, operation 620 may include an operation of providing the updated service list to the user every time that the updating is performed, and may enable to user to have an accurate list.

In operation 630, whether a service requested from a user is included in a service list is determined. In operation 640, the requested service is immediately provided when the requested service is included in the service list.

In operation 650, the requested service is registered in a pending list when the requested service is not included in the service list. In this case, even though the requested service is not included in the service list, the requested service may not be immediately registered in the pending list. Whether the requested service is a service providable at a current location may be additionally determined, and the requested service may be registered in the pending list when the determining determines that the requested service is not providable at the current location. Even though the requested service was not providable when the service list is generated, the requested service may be providable at the current location at a current time since a location of the mobile terminal is changed after the service list is updated. Therefore, whether the requested service is providable may be additionally determined at a point in time the user requests the service. When the determining also determines that the requested service is not providable, the requested service may be added to the pending list.

In this case, whether a PMCH mapped to the requested service may be used for reception is determined, and, when the determining determines that the PMCH mapped to the requested service may be used for reception, the requested service may be determined as a providable service.

In operation 660, whether a service providable at the current location exists among services registered in the pending list is determined. Specifically, since the location of the terminal may be continuously changed, the service list may be updated based on a predetermined period to determine whether the service providable at the current location exists among the services included in the pending list.

In operation 670, the service providable at the current location among services included in the pending list is provided.

A service list listing services providable based on a location of a mobile terminal may be provided. When a user requests a service that is not providable, the request service may be managed using a pending list and may be provided when the mobile terminal is in a location where the request service is providable. Accordingly, radio resources of the mobile terminal may be effectively used.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An apparatus of controlling a multimedia broadcast and multicast service based on a user location, the apparatus comprising:
    a receiving unit to receive multicast control channel (MCCH) information;
    a list updating unit to periodically update a service list of a mobile terminal using the received MCCH information, the service list listing services that are providable;
    a pending list registration unit to register a service in a pending list when the service is not included in the updated service list and is requested to be provided; and
    a service providing unit to automatically provide the service registered in the pending list when the mobile terminal reaches a location where the mobile terminal is capable of providing the service registered in the pending list,
    wherein the service providing unit determines whether at least one of the services registered in the pending list is providable or not at a current location of the mobile terminal,
    wherein, when a physical multicast channel (PMCH) mapped to the service that is requested is incapable of being used for reception, the pending list registration unit registers the service that is requested in the pending list.

2. The apparatus of claim 1, wherein the list updating unit comprises:
    a list providing unit to provide the updated service list to a user every time the updating is performed.

3. The apparatus of claim 1, wherein the list updating unit comprises:
    an information extracting unit to extract, from the received MCCH information, the PMCH setting information and service information provided via each PMCH,
    wherein the list updating unit updates the service list listing services providable at a current location, based on the PMCH setting information and the service information provided via each PMCH.

4. The apparatus of claim 3, wherein the list updating unit further comprises:
    a PMCH measuring unit to periodically detect whether each PMCH is capable of being used for reception,
    wherein the list updating unit sets a service provided via a PMCH capable of being used for reception as a service that is providable, and sets a service provided by a PMCH incapable of being used for reception as a service that is not providable, to update the service list.

5. The apparatus of claim 4, wherein the PMCH measuring unit comprises:
    a reference signal receiving unit to receive a reference signal with respect to each PMCH; and
    a PMCH determining unit to determine a PMCH of which a reference signal is received as the PMCH that is capable of being used for reception.

6. The apparatus of claim 1, wherein the pending list registration unit comprises a reception determining unit to determine whether the PMCH mapped to a service is capable of being used for reception when the service that is not included in the generated service list is requested to be provided.

7. The apparatus of claim 6, wherein the service providing unit provides the requested service when the determining determines that the PMCH mapped to the requested service is capable of being used for reception.

8. The apparatus of claim 1, wherein the pending list registration unit comprises:
a screen displaying unit to display, on a screen, a message that the requested service is not providable at a current location.

9. The apparatus of claim 1, wherein the service providing unit provides a service that is providable by the mobile terminal at the current location, among the services in the pending list.

10. The apparatus of claim 9, wherein the service providing determining unit determines whether the services in the pending list are providable every update period of the service list listing services that are providable.

11. A method of controlling a multimedia broadcast and multicast service based on a user location, the method comprising:
receiving MCCH information;
periodically updating a service list of a mobile terminal using the received MCCH information, the service list listing services that are providable;
registering a service in a pending list when the service is not included in the updated service list and is requested to be provided; and
providing automatically the service registered in the pending list when the mobile terminal reaches a location where the mobile terminal is capable of providing the service registered in the pending list,
wherein the providing comprises determining whether at least one of the services registered in the pending list is providable or not at a current location of the mobile terminal,
wherein, when a physical multicast channel (PMCH) mapped to the service that is requested is incapable of being used for reception, the registering comprises registering the service that is requested in the pending list.

12. The method of claim 11, wherein the updating comprises providing the updated service list to a user every time the updating is performed.

13. The method of claim 11, wherein the updating comprises:
extracting, from the received MCCH information, PMCH setting information and service information provided via each PMCH; and
updating the service list listing services providable at a current location, based on the PMCH setting information and the service information provided via each PMCH.

14. The method of claim 13, wherein the updating comprises:
periodically detecting whether each PMCH is capable of being used for reception; and
setting a service provided via a PMCH capable of being used for reception as a service that is providable, and setting a service provided by a PMCH incapable of being used for reception as a service that is not providable, to update the service list.

15. The method of claim 14, wherein the detecting comprises:
receiving a reference signal with respect to each PMCH; and
determining a PMCH through which a reference signal is received as the PMCH that is capable of being used for reception.

16. The method of claim 11, wherein the registering comprises determining whether the PMCH mapped to a service is capable of being used for reception, when the service that is not included in the generated service list is requested to be provided.

17. The method of claim 16, wherein the registering further comprises:
providing the requested service when the determining determines that the PMCH mapped to the requested service is capable of being used for reception.

18. The method of claim 11, wherein the registering further comprises:
displaying, on a screen, a message that the requested service is not providable at a current location.

19. The method of claim 11, wherein the providing comprises:
providing a service that is providable by the mobile terminal among the services in the pending list at the current location.

20. The method of claim 19, wherein the determining determines whether the services in the pending list are providable every update period of the service list listing services that are providable.

* * * * *